US010030749B2

(12) United States Patent
Uchino et al.

(10) Patent No.: US 10,030,749 B2
(45) Date of Patent: Jul. 24, 2018

(54) CONTINUOUSLY VARIABLE TRANSMISSION

(71) Applicant: HONDA MOTOR CO., LTD., Tokyo (JP)

(72) Inventors: Satoshi Uchino, Wako (JP); Atsushi Fujikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 432 days.

(21) Appl. No.: 14/894,200

(22) PCT Filed: May 27, 2014

(86) PCT No.: PCT/JP2014/063990
§ 371 (c)(1),
(2) Date: Nov. 25, 2015

(87) PCT Pub. No.: WO2014/192753
PCT Pub. Date: Dec. 4, 2014

(65) Prior Publication Data
US 2016/0102741 A1    Apr. 14, 2016

(30) Foreign Application Priority Data
May 28, 2013 (JP) ................................ 2013-112031

(51) Int. Cl.
*F16H 37/00* (2006.01)
*F16H 37/02* (2006.01)

(52) U.S. Cl.
CPC ..... *F16H 37/021* (2013.01); *F16H 2037/025* (2013.01); *F16H 2037/026* (2013.01)

(58) Field of Classification Search
CPC ............. F16H 37/021; F16H 2037/025; F16H 2037/026
(Continued)

(56) References Cited

U.S. PATENT DOCUMENTS 4,539,866 A    9/1985    Koivunen
5,071,391 A    12/1991    Kita
(Continued)

FOREIGN PATENT DOCUMENTS

CN    87 1 07940 A    6/1988
CN    200999844 Y    1/2008
(Continued)

OTHER PUBLICATIONS

Office Action dated Mar. 23, 2017, issued in Chinese Application No. 201480025806.4, with English translation. (15 pages).
(Continued)

*Primary Examiner* — William C Joyce
(74) *Attorney, Agent, or Firm* — Westerman, Hattori, Daniels & Adrian, LLP

(57) ABSTRACT

In a continuously variable transmission, driving force from a drive source is transmitted via a path to establish a LOW mode. A large torque that is transmitted in the LOW mode passes through a first output switching mechanism. Since a countershaft is relatively rotatably disposed on an outer periphery of an input shaft, and the first output switching mechanism is disposed on the countershaft, the countershaft which transmits a large torque is disposed on an outer peripheral side of a double tube and supported directly by a transmission case, and the input shaft which transmits a relatively small torque is supported via the countershaft, thereby making it possible to support the first output switching mechanism with high rigidity without carrying out special reinforcement.

7 Claims, 11 Drawing Sheets

(58) Field of Classification Search
USPC .......................................................... 74/664
See application file for complete search history.

(56) References Cited

U.S. PATENT DOCUMENTS

| | | | |
|---|---|---|---|
| 5,207,617 | A | 5/1993 | Kato et al. |
| 5,846,152 | A | 12/1998 | Taniguchi et al. |
| 6,997,831 | B2 | 2/2006 | Kanda et al. |
| 8,771,116 | B2 | 7/2014 | Triller |
| 2007/0021259 | A1 | 1/2007 | Tenberge |
| 2012/0244973 | A1 | 9/2012 | Horiike |

FOREIGN PATENT DOCUMENTS

| | | | |
|---|---|---|---|
| CN | 101526123 A | | 9/2009 |
| DE | 33 44 042 | * | 6/1985 |
| DE | 41 19 291 | * | 12/1992 |
| DE | 42 07 093 A1 | | 4/1993 |
| DE | 42 34 629 A1 | | 4/1993 |
| DE | 196 31 072 A1 | | 2/1998 |
| EP | 1 347 209 A2 | | 9/2003 |
| JP | 60-113850 A | | 6/1985 |
| JP | 2000-320630 A | | 11/2000 |
| JP | 2008-208854 A | | 9/2008 |
| JP | 2009-503379 A | | 1/2009 |
| JP | 2010-530503 A | | 9/2010 |
| JP | 2010-261544 A | | 11/2010 |
| JP | 2011-122684 A | | 6/2011 |
| WO | 2013/175568 A1 | | 11/2013 |

OTHER PUBLICATIONS

Notice of Allowance dated Sep. 13, 2017, issued in U.S. Appl. No. 14/893,798 (22 pages).
International Search Report dated Sep. 2, 2014, issued in International Application No. PCT/JP2014/063989 (2 pages).
International Search Report dated Sep. 2, 2014, issued in counterpart Application No. PCT/JP2014/063990 (2 pages).

* cited by examiner

LOW MODE

| | |
|---|---|
| LOW FRICTION CLUTCH 24A | ON |
| HI FRICTION CLUTCH 24B | OFF |
| FIRST OUTPUT SWITCHING MECHANISM 37 | RIGHT (LOW) |
| SECOND OUTPUT SWITCHING MECHANISM 38 | NEUTRAL |

TRANSITION MODE 1

| | |
|---|---|
| LOW FRICTION CLUTCH 24A | ON |
| HI FRICTION CLUTCH 24B | OFF |
| FIRST OUTPUT SWITCHING MECHANISM 37 | RIGHT (LOW) |
| SECOND OUTPUT SWITCHING MECHANISM 38 | RIGHT (HI) |

TRANSITION MODE 2

| LOW FRICTION CLUTCH 24A | OFF |
|---|---|
| HI FRICTION CLUTCH 24B | ON |
| FIRST OUTPUT SWITCHING MECHANISM 37 | RIGHT (LOW) |
| SECOND OUTPUT SWITCHING MECHANISM 38 | RIGHT (HI) |

HI MODE

| | |
|---|---|
| LOW FRICTION CLUTCH 24A | OFF |
| HI FRICTION CLUTCH 24B | ON |
| FIRST OUTPUT SWITCHING MECHANISM 37 | NEUTRAL |
| SECOND OUTPUT SWITCHING MECHANISM 38 | RIGHT (HI) |

RVS MODE

| | |
|---|---|
| LOW FRICTION CLUTCH 24A | ON |
| HI FRICTION CLUTCH 24B | OFF |
| FIRST OUTPUT SWITCHING MECHANISM 37 | LEFT (RVS) |
| SECOND OUTPUT SWITCHING MECHANISM 38 | NEUTRAL |

DIRECTLY COUPLED LOW MODE

| LOW FRICTION CLUTCH 24A | ON |
|---|---|
| HI FRICTION CLUTCH 24B | OFF |
| FIRST OUTPUT SWITCHING MECHANISM 37 | NEUTRAL |
| SECOND OUTPUT SWITCHING MECHANISM 38 | RIGHT (HI) |

DIRECTLY COUPLED HI MODE

| LOW FRICTION CLUTCH 24A | OFF |
|---|---|
| HI FRICTION CLUTCH 24B | ON |
| FIRST OUTPUT SWITCHING MECHANISM 37 | RIGHT (LOW) |
| SECOND OUTPUT SWITCHING MECHANISM 38 | NEUTRAL |

CONTINUOUSLY VARIABLE TRANSMISSION

TECHNICAL FIELD

The present invention relates to a continuously variable transmission in which a belt type continuously variable transmission mechanism is combined with a speed decreasing mechanism and a speed increasing mechanism.

BACKGROUND ART

There is known from Patent Document 1 below a continuously variable transmission that includes an input shaft, an output shaft, a belt type continuously variable transmission mechanism having a first pulley and a second pulley connected via an endless belt, a clutch that connects the input shaft and the first pulley via a gear train, a clutch that connects the input shaft and the second pulley via a gear train, a clutch that connects the output shaft and the first pulley via a gear train, and a clutch that connects the output shaft and the second pulley via a gear train, the overall gear ratio being enlarged by combining a mode in which a driving force is transmitted from the first pulley to the second pulley and a mode in which a driving force is transmitted from the second pulley to the first pulley.

Such a continuously variable transmission in which a first clutch and a second clutch are disposed at opposite ends of an input shaft connected to an engine, the driving force of the input shaft is transmitted to a first pulley of a belt type continuously variable transmission mechanism by means of engagement of the first clutch to thus establish a LOW mode, and the driving force of the input shaft is transmitted to a second pulley of the belt type continuously variable transmission mechanism by means of engagement of the second clutch to thus establish a HI mode has been proposed by PCT/JP2012/063029 (International Patent Publication Laid-open No. WO2013/175568) filed by the present applicant.

RELATED ART DOCUMENTS

Patent Documents

Patent Document 1: Japanese Patent Publication (PCT) No. 2010-530503

SUMMARY OF THE INVENTION

Problems to be Solved by the Invention

Of the continuously variable transmissions proposed in PCT/JP2012/063029 above, in an embodiment shown in FIG. 20, when the LOW mode is established by means of engagement of the first clutch, the driving force of the engine E is transmitted from the input shaft via the path: first clutch→first pulley→endless belt→second pulley→dog clutch (output switching mechanism) supported on input shaft→differential gear. Since the torque transmitted is larger in the LOW mode than in the HI mode, it is necessary to strongly support the dog clutch so that it can withstand a large torque. However, since the dog clutch is not directly supported on the transmission case but is supported via the input shaft, in order to strongly support the dog clutch it is necessary to increase the diameter of the input shaft, which does not transmit a large torque, and there is the problem that the weight thereby increases.

The present invention has been accomplished in light of the above circumstances, and it is an object thereof to enhance the support rigidity by directly supporting on a transmission case an output switching mechanism that is supported on the outer periphery of an input shaft and transmits a large torque in a LOW mode.

Means for Solving the Problems

In order to attain the above object, according to a first aspect of the present invention, there is provided a continuously variable transmission comprising an input shaft into which driving force from a drive source is inputted, a belt type continuously variable transmission mechanism that is formed from a first pulley, a second pulley, and an endless belt an output shaft that outputs the driving force whose speed has been changed by the belt type continuously variable transmission mechanism, a first input path that transmits the driving force from the drive source to the first pulley, a first input switching mechanism that switches the driving force from the drive source toward the first input path side, a speed decreasing mechanism that is disposed in the first input path and decreases the speed of an input to the first pulley, a second input path that transmits the driving force from the drive source to the second pulley, a second input switching mechanism that switches the driving force from the drive source toward the second input path side, a speed increasing mechanism that is disposed in the second input path and increases the speed of an input to the second pulley, a first output path that outputs the driving force from the second pulley, a second output path that outputs the driving force from the first pulley, a first output switching mechanism that is disposed in the first output path and switches the driving three from the second pulley toward the output shaft side, and a second output switching mechanism that is disposed in the second output path and switches the driving force from the first pulley toward the output shaft side, the first pulley comprises a first fixed pulley and a first movable pulley, the second pulley comprises a second fixed pulley and a second movable pulley, the first fixed pulley and the second fixed pulley are disposed at mutually diagonal positions, the first movable pulley and the second movable pulley are disposed at mutually diagonal positions, the first input switching mechanism is disposed on the input shaft or on a rotating shaft on a rear face of the first movable pulley of the first pulley, the second input switching mechanism is disposed on a rotating shaft on a rear face of the second fixed pulley of the second pulley or on the input shaft, the first output switching mechanism is disposed on a countershaft relatively rotatably fitted around an outer periphery of the input shaft on the first output path, and the second output switching mechanism and the output shaft are disposed on a rotating shaft on a rear face of the first fixed pulley of the first pulley.

Further, according to a second aspect of the present invention, in addition to the first aspect, the first output switching mechanism is formed from a dog clutch that can selectively join to the countershaft a first drive gear and a second drive gear relatively rotatably supported on the countershaft, the first drive gear is connected to a driven gear provided on the output shaft, and the second drive gear is connected to the driven gear provided on the output shaft via an idle shaft.

Furthermore, according to a third aspect of the present invention, in addition c the first or second aspect, the first output switching mechanism is disposed at a position in which part thereof overlaps the second output switching mechanism when viewed in a radial direction.

Moreover, according to a fourth aspect, in addition to any one of the first to third aspects, when a gear ratio of the speed decreasing mechanism is $i_{red}$, a gear ratio of the speed increasing mechanism is $i_{ind}$, the minimum ratio of the first pulley and the second pulley is $i_{min}$, and a gear ratio of the reduction gears disposed in the first output path is $i_{sec}$, the relationship $i_{red} \times i_{min} = i_{ind}$ and the relationship $i_{sec} = i_{red}/i_{ind}$ hold.

A main input shaft 13 of an embodiment corresponds to the input shall of the present invention, a LOW friction clutch 24A of an embodiment corresponds to the first input switching mechanism of the present invention, a HI friction clutch 24B of the embodiment corresponds to the second input switching mechanism of the present invention, a first reduction gear 25 and a second reduction gear 26 of the embodiment correspond to the speed decreasing mechanism of the present invention, a first induction gear 27 and a second induction gear 28 of the embodiment correspond to the speed increasing mechanism of the present invention, a fifth reduction gear 29 of the embodiment corresponds to the first drive gear of the present invention, a sixth reduction gear 30 of the embodiment corresponds to the driven gear of the present invention, and a reverse drive gear 34 of the embodiment corresponds to the second drive gear of the present invention, a third reduction gear 39, a fourth reduction gear 40, a fifth reduction gear 29, and a sixth reduction gear 30 of the embodiment correspond to the reduction gear of the present invention, and an engine E of the embodiment corresponds to the drive source of the present invention.

Effects of the Invention

In accordance with the first aspect of the present invention, the driving force from the drive source is transmitted via the path: input shaft→first input switching mechanism and speed decreasing mechanism (or speed decreasing mechanism and first input switching mechanism)→first pulley→endless belt→second pulley→first output switching mechanism disposed in first output path→output shaft to thus establish a LOW mode, and the driving force from the drive source is transmitted via the path: input shaft→speed increasing mechanism and second input switching mechanism for second input switching mechanism and speed increasing mechanism)→second pulley→endless belt→first pulley→second output switching mechanism→output shaft to thus establish a HI mode.

A large torque that is transmitted in the LOW mode passes through the first output switching mechanism, but since the countershaft is relatively rotatably disposed on the outer periphery of the input shaft, and the first output switching mechanism is disposed on the countershaft, the input shaft and the countershaft form a double tithe structure; the countershaft, which transmits a large torque, is disposed on the outer peripheral side of the double tube and supported directly by the transmission case, thereby making it possible to support the first output switching mechanism with high rigidity without carrying out special reinforcement.

Moreover, since the first input switching mechanism is disposed on the input shaft or on the rotating shaft on the rear face of the first movable pulley of the first pulley, the second input switching mechanism is disposed on the rotating shaft on the rear face of the second fixed pulley of the second pulley or on the input shaft, the first output switching mechanism is disposed on the countershaft relatively rotatably fitted around the outer periphery of the input shaft in the first output path, and the second output switching mechanism and the output shaft are disposed on the rotating shaft on the rear face of the first fixed pulley of the first pulley, it is possible, by disposing the second input switching mechanism, the second output switching mechanism, and the output shaft by utilizing effectively dead space formed on the rear face side of the first and second fixed pulleys, to reduce the size of the continuously variable transmission.

Furthermore, in accordance with the second aspect of the present invention, since the first output switching mechanism is formed from a dog clutch that can selectively join to the countershaft a first drive gear and a second drive gear relatively rotatably supported on the countershaft, the first drive gear is connected to a driven gear provided on the output shaft, and the second drive gear is connected to the driven gear provided on the output shaft via an idle shaft, it is possible to selectively establish a LOW mode and an RVS mode by means of the first output switching mechanism.

Moreover, in accordance with the third aspect of the present invention, since the first output switching mechanism is disposed at a position in which part thereof overlaps the second output switching mechanism when viewed in the radial direction, it is possible, by compactly disposing the first output switching mechanism and the second output switching mechanism, to reduce the size of the continuously variable transmission.

Furthermore, in accordance with the fourth aspect of the present invention, when the gear ratio of the speed decreasing mechanism is $i_{red}$, the gear ratio of the speed increasing mechanism is $i_{ind}$, the minimum ratio of the first pulley and the second pulley is $i_{min}$, and the gear ratio of the reduction gears disposed in the first output path is $i_{sec}$, since the relationship $i_{red} \times i_{min} = i_{ind}$ and the relationship $i_{sec} = i_{red}/i_{ind}$ hold, it is possible to smoothly operate the first output switching mechanism and the second output switching mechanism in a state in which there is no differential rotation at a time of transition between the LOW mode and the HI mode.

EXPLANATION OF REFERENCE NUMERALS AND SYMBOLS BRIEF DESCRIPTION OF DRAWINGS

EXPLANATION OF REFERENCE NUMERALS AND SYMBOLS

Figure 1:
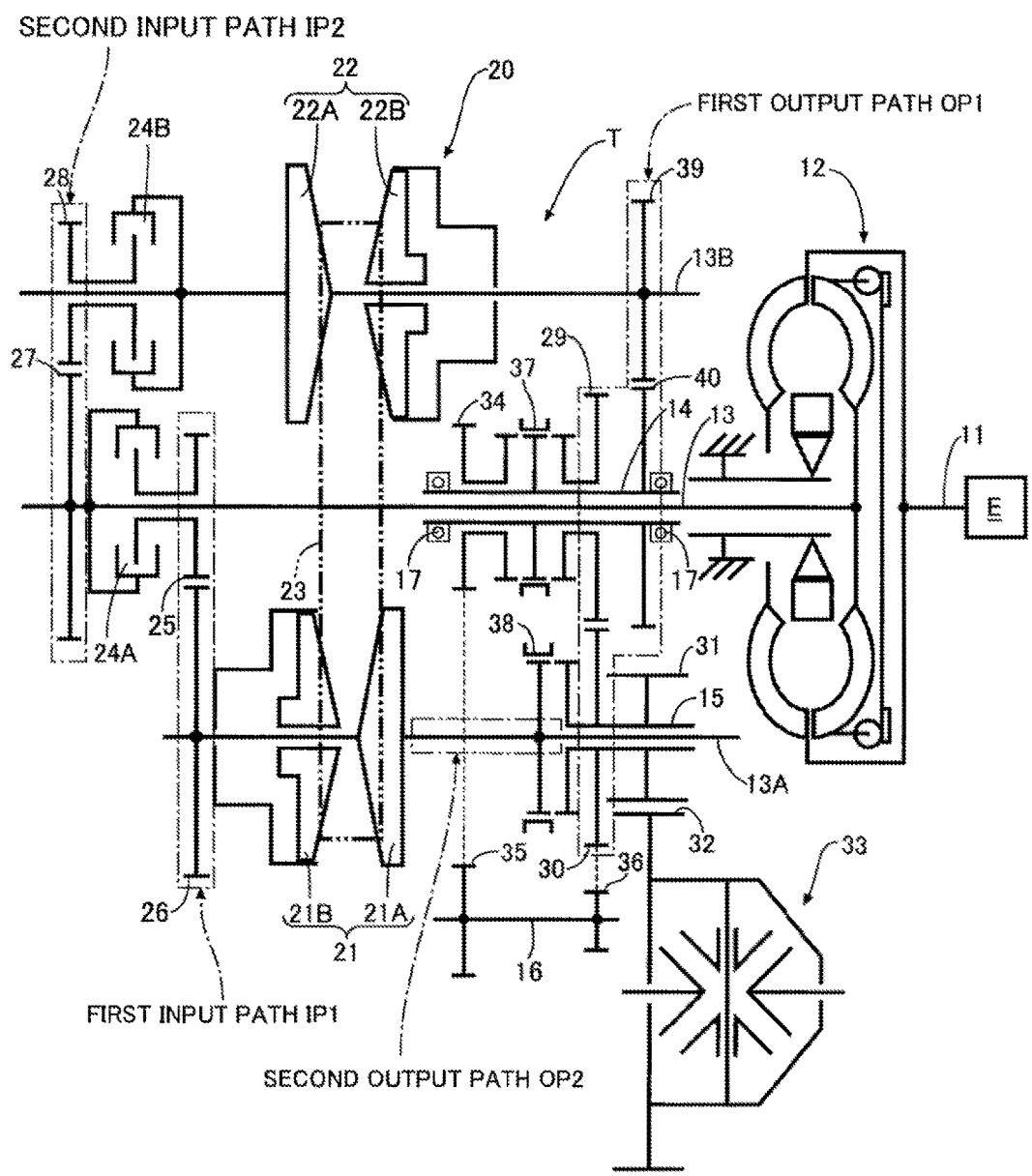
FIG. 1 is a skeleton diagram of a continuously variable transmission. (first embodiment)

13 Main input shaft (input shaft)
14 Countershaft
15 Output shaft
16 Idle shaft
20 Belt type continuously variable transmission mechanism
21 First pulley
21A First fixed pulley
21B First movable pulley
22 Second pulley
22A Second fixed pulley
22B Second movable pulley
23 Endless belt
24A LOW friction clutch (first input switching mechanism)
24B HI friction clutch (second input switching mechanism)
25 First reduction gear (speed decreasing mechanism)
26 Second reduction gear (speed decreasing mechanism)
27 First induction gear (speed increasing mechanism)
28 Second induction gear (speed increasing mechanism)
29 Fifth reduction gear (first drive gear or reduction gear)
30 Sixth reduction gear (driven gear or reduction (rear))
34 Reverse drive gear (second drive gear)
37 First output switching mechanism
38 Second output switching mechanism
39 Third reduction gear (reduction gear)
40 Fourth reduction gear (reduction gear)
E Engine (drive source)
IP1 First input path
IP2 Second input path
OP1 First output path
OP2 Second output path

MODE FOR CARRYING OUT THE INVENTION

An embodiment of the present invention is explained below by reference to FIG. 1 to FIG. 11.

First Embodiment

As shown in FIG. 1, a continuously variable transmission T mounted on a vehicle includes an input shaft 13 that is connected to a crankshaft 11 of an engine E via a torque converter 12, a first auxiliary input shaft 13A, a second auxiliary input shaft 13B, a countershaft 14, an output shaft 15, and an idle Shaft 16, which are disposed in parallel to the main input shaft 13, the tubular countershaft 14 is relatively rotatably fitted around the outer periphery of the main input shaft 13, and the tubular output shaft 15 is relatively rotatably fitted around the outer periphery of the first auxiliary input shaft 13A. The countershaft 14 is supported on a transmission case via bearings 17 and 17.

A first reduction gear 25 relatively rotatably supported on the main input shaft 13 and a second reduction gear 26 fixedly provided on the first auxiliary input shaft 13A are meshed together, and the first reduction gear 25 can be joined to the main input shaft 13 via a LOW friction clutch 24A. Furthermore, a first induction gear 27 fixedly provided on the main input Shaft 13 and a second induction gear 28 relatively rotatably supported on the second auxiliary input shaft 13B are meshed together, and the second induction gear 28 can be joined to the second auxiliary input shaft 13B via a HI friction clutch 24B.

A belt type continuously variable transmission mechanism 20 disposed between the first auxiliary input shaft 13A and the second auxiliary input shaft 13B includes a first pulley 21 provided on the first auxiliary input shaft 13A, a second pulley 22 provided on the second auxiliary input shaft 13B, and an endless belt 23 wound around the first and second pulleys 21 and 22. The groove widths of the first and second pulleys 21 and 22 are increased and decreased in opposite directions from each other by means of oil pressure, thus continuously changing the gear ratio between the first auxiliary input shaft 13A and the second auxiliary input shaft 13B. The first pulley 21 is formed from a first fixed pulley 21A fixed to the first auxiliary input shaft 13A, and a first movable pulley 21B that can move toward and away from the first fixed pulley 21A. Furthermore, the second pulley 22 is formed from a second fixed pulley 22A fixed to the second auxiliary input shaft 13B, and a second movable pulley 22B that can move toward and away from the second fixed pulley 22A.

Furthermore, a third reduction gear 39 fixedly provided on the second input shaft 13B and a fourth reduction gear 40 fixedly provided on the countershaft 14 are meshed together, a fifth reduction gear 29 relatively rotatably supported on the countershaft 14 and a sixth reduction gear 30 fixedly provided on the output shaft 15 are meshed together, and a final drive gear 31 integral with the sixth reduction gear 30 and a final driven gear 32 provided on a differential gear 33 are meshed together. A reverse drive gear 34 relatively rotatably supported on the countershaft 14 and a reverse idle gear 35 fixedly provided on the idle shaft 16 are meshed together, and a reverse driven gear 36 fixedly provided on the idle shaft 16 meshes with the sixth reduction gear 30.

A first output switching mechanism 37, which is a dog clutch, is provided on the outer periphery of the countershaft 14. The first output switching mechanism 37 can switch between a neutral position, a rightward-moved position, and a leftward-moved position; when moved rightward from the neutral position the fifth reduction gear 29 is joined to the countershaft 14, and when moved leftward from the neutral position the reverse drive gear 34 is joined to the countershaft 14. A second output switching mechanism 38, which is a dog clutch, is provided on the outer periphery of the first auxiliary input shaft 13A. The second output switching mechanism 38 can switch between a neutral position and a rightward-moved position, and when moved rightward from the neutral position the sixth reduction gear 30 and the final drive gear 31 are joined to the first auxiliary input shaft 13A.

The first and second reduction gears 25 and 26 reduce the speed of rotation of the main input shaft 13 and transmit it to the first auxiliary input shaft 13A. On the other hand, the first and second induction gears 27 and 28 increase the speed of rotation of the main input shaft 13 and transmit it to the second auxiliary input shaft 13B. The first reduction gear 25 and the second reduction gear 26 form a first input path IP1 of the present invention, and the first induction gear 27 and the second induction gear 28 form a second input path IP2 of the present invention. The third reduction gear 39, the fourth reduction gear 40, the fifth reduction gear 29, and the sixth reduction gear 30 form a first output path OP1 of the present invention, and the first auxiliary input shaft 13A between the first pulley 21 and the second output switching mechanism 38 forms a second output path OP2 of the present invention.

When the gear ratio from the first reduction gear 25 to the second reduction gear 26 is defined as $i_{red}$, the gear ratio from the first induction gear 27 to the second induction gear 28 is defined as $i_{ind}$, and the minimum gear ratio from the first pulley 21 to the second pulley 22 of the belt type continuously variable transmission mechanism 20 is defined as $i_{min}$, the gear ratios are set so that $i_{red} \times i_{min} = i_{ind}$. When the gear ratio from the third reduction gear 39 to the sixth reduction gear 30 via the fourth reduction gear 40 and the fifth reduction gear 29 is defined as $i_{sec}$, the gear ratios are set so that $i_{sec} = i_{red}/i_{ind}$.

Figure 2:
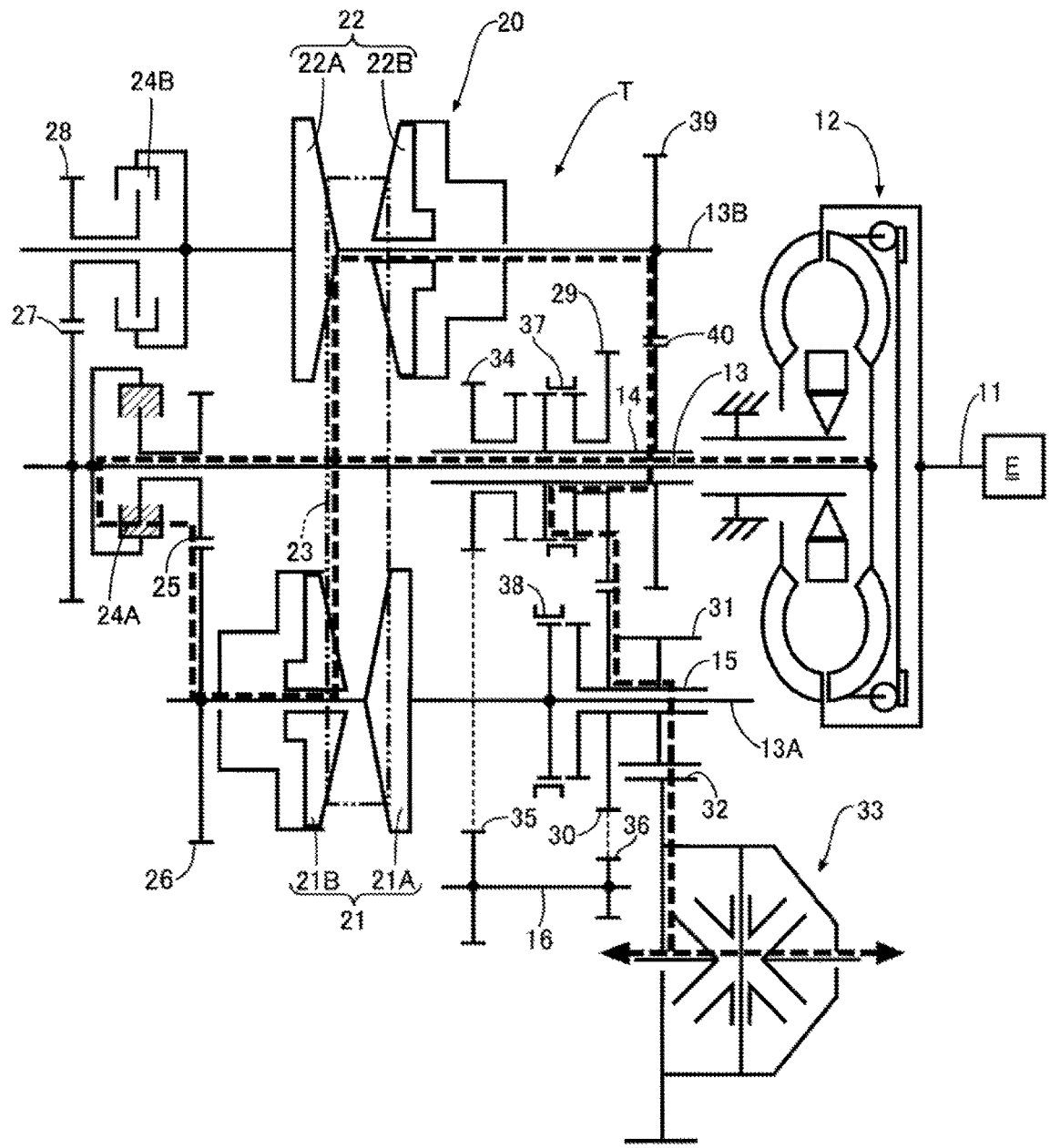
FIG. 2 is a torque flow diagram of a LOW mode. (first embodiment)

FIG. 2 shows a LOW mode of the continuously variable transmission T. In the LOW mode, the LOW friction clutch 24A is engaged, the HI friction clutch 24B is disengaged, the first output switching mechanism 37 is operated to the rightward-moved position (LOW position), and the second output switching mechanism 38 is operated to the neutral position.

As a result, the driving force of the engine E is transmitted to the differential gear 33 via the path: crankshaft 11→torque converter 12→main input shaft 13→LOW friction clutch 24A→first reduction gear 25→second reduction gear 26→first auxiliary input shaft 13A→first pulley 21→endless belt 23→second pulley 22→second auxiliary input shaft 13B→third reduction gear 39→fourth reduction gear 40→countershaft 14→first output switching mechanism 37→fifth reduction gear 29→sixth reduction gear 30→output shaft 15→final drive gear 31→final driven gear 32.

In the LOW mode the belt type continuously variable transmission mechanism 20 transmits the driving force from the first auxiliary input shaft 13A side to the second auxiliary input shaft 13B side, and according to the change in the gear ratio thereof the overall gear ratio of the continuously variable transmission T is changed.

Figure 3:
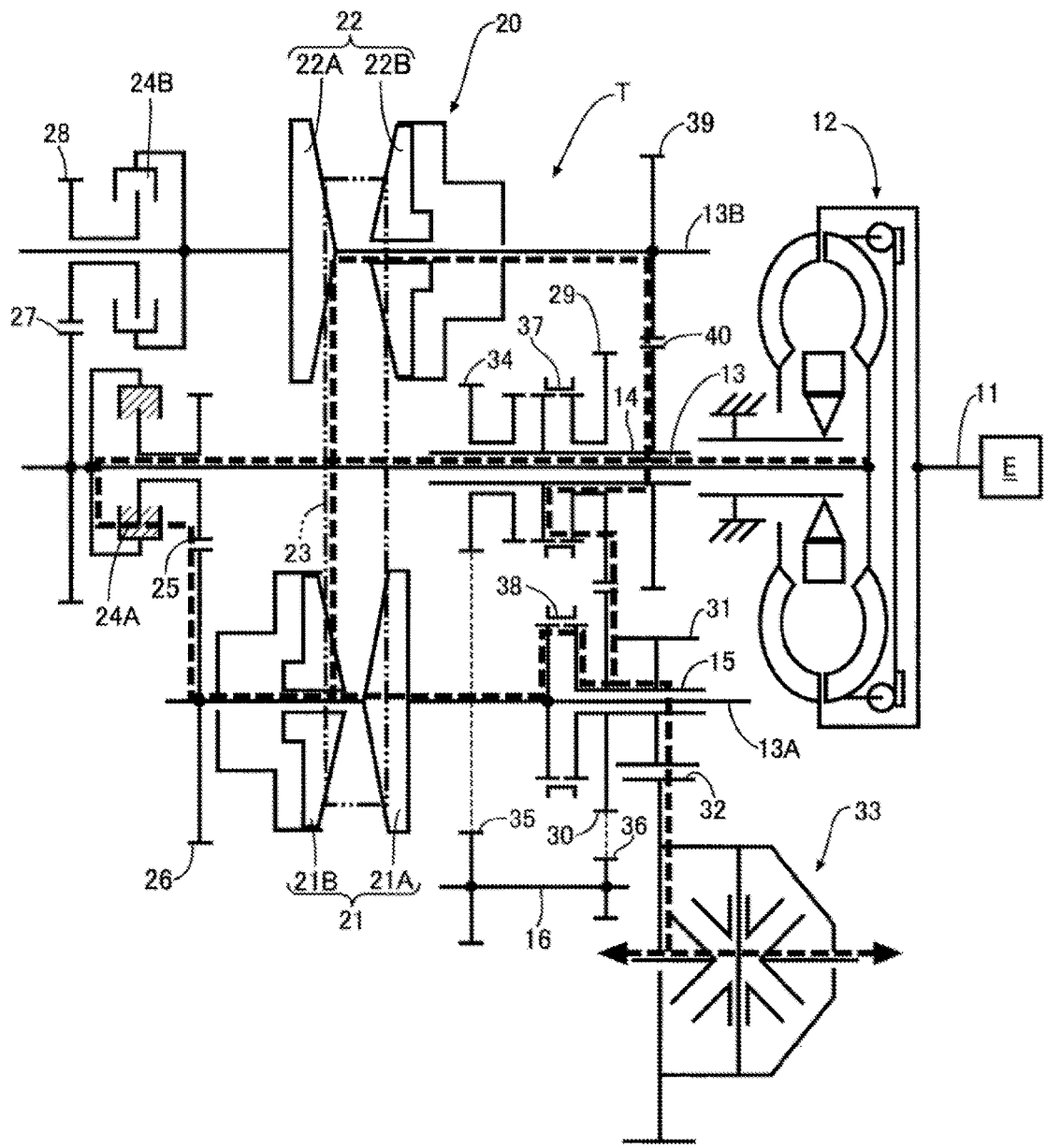
FIG. 3 is a torque flow diagram of transition mode 1. (first embodiment)

FIG. 3 shows a transition mode 1 as a first-half transition from the LOW mode to the HI mode, which is described later. In transition mode 1, the LOW friction clutch 24A is engaged, the HI friction clutch 24B is disengaged, the first output switching mechanism 37 is operated to the rightward-moved position (LOW position), the second output switching mechanism 38 is operated h the rightward-moved position (HI position), and the LOW mode and a directly coupled LOW mode (see FIG. 7), which is described later, are established at the same time.

Figure 4:
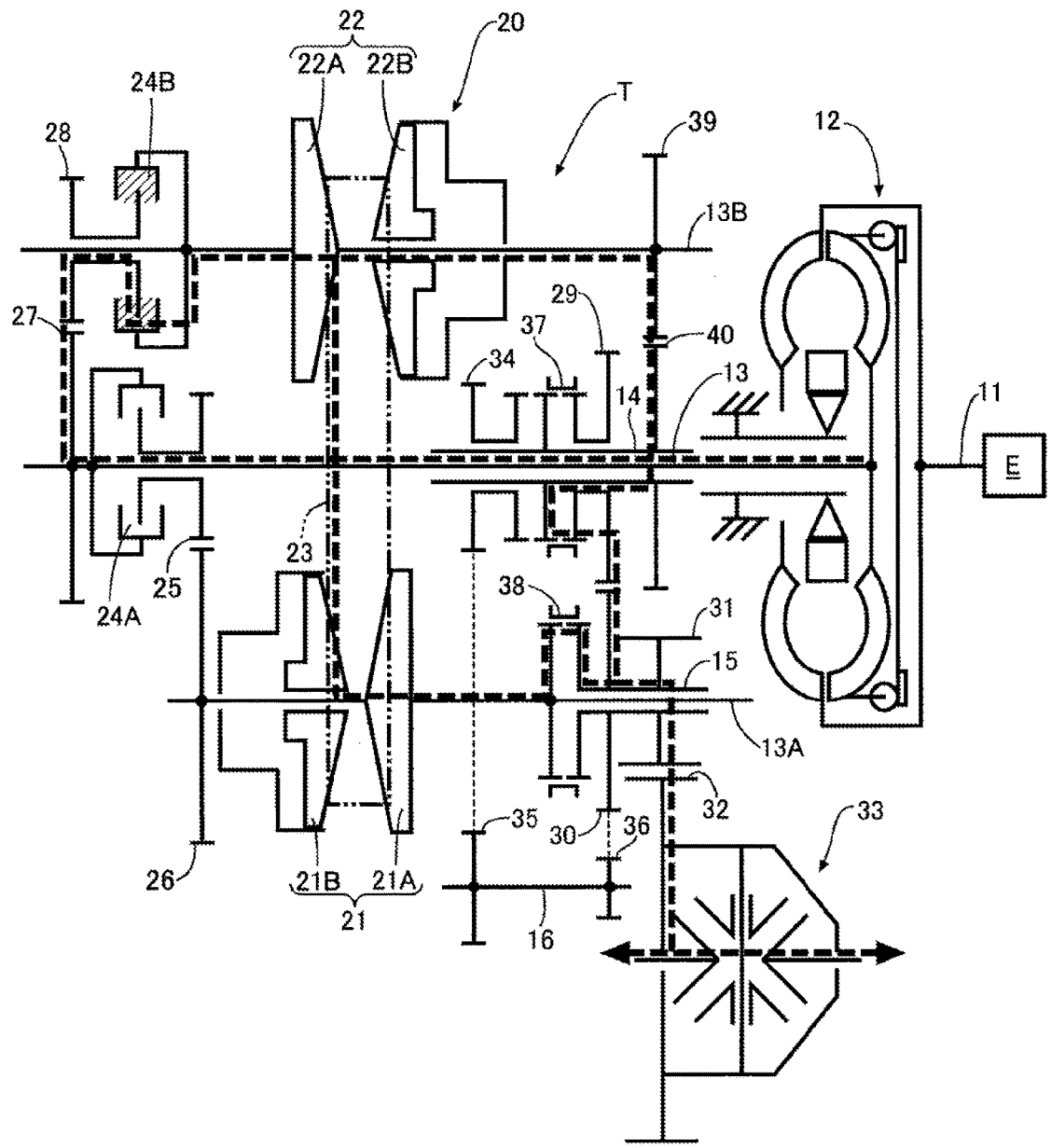
FIG. 4 is a torque flow diagram of transition mode 2. (first embodiment)

FIG. 4 shows a transition mode 2 as a second-half transition from the LOW mode to the HI mode, which is described later. In transition mode 2, the LOW friction clutch 24A is disengaged, the HI friction clutch 24B is engaged, the first output switching mechanism 37 is operated to the rightward-moved position (LOW position), the second output switching mechanism 38 is operated to the rightward-moved position (HI position), and the HI mode (see FIG. 5), which is described later, and a directly coupled HI mode (see FIG. 8), which is described later, are established at the same time.

Transition mode 1 and transition mode 2 are for smoothly carrying out a transition from the LOW mode to the HI mode, and details thereof are described later.

Figure 5:
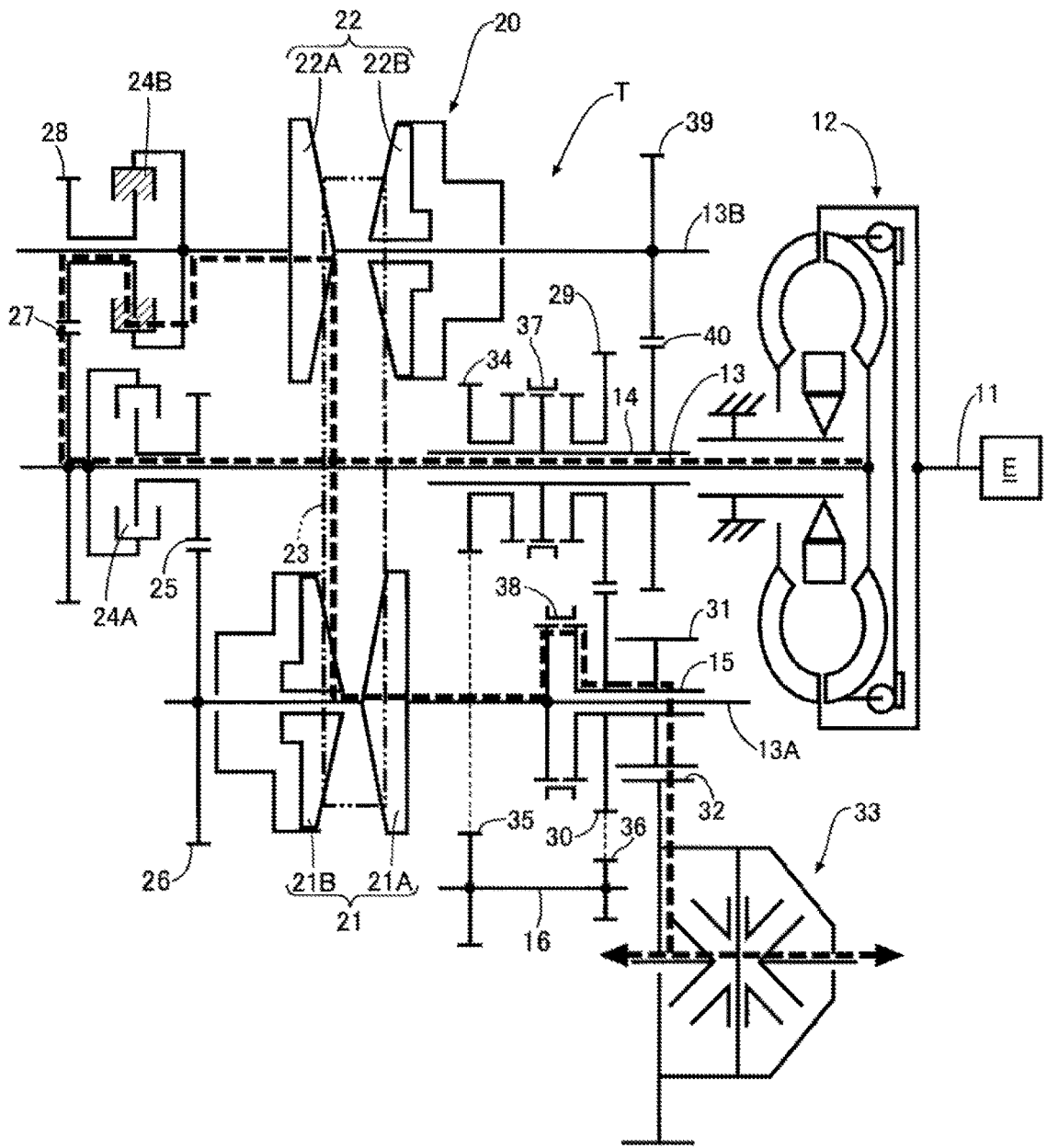
FIG. 5 is a torque flow diagram of a HI mode. (first embodiment)

FIG. 5 shows the HI mode of the continuously variable transmission T. In the HI mode, the LOW friction clutch 24A is disengaged, the HI friction clutch 24B is engaged, the first output switching mechanism 37 is operated to the neutral position, and the second output switching mechanism 38 is operated to the rightward-moved position (HI position).

As a result, the driving force of the engine E is transmitted to the differential gear 33 via the path: crankshaft 11→torque converter 12→main input shaft 13→first induction gear 27→second induction gear 28→HI friction clutch 24B→second auxiliary input shaft 13B→second pulley 22→endless belt 23→first pulley 21→first auxiliary input shaft 13A→second output switching mechanism 38→output shaft 15→final drive gear 31→final driven gear 32.

In the HI mode, the belt type continuously variable transmission mechanism 20 transmits the driving force from the second auxiliary input shaft 13B side to the first auxiliary input shaft 13A side, and according to the change in the gear ratio thereof the overall gear ratio of the continuously variable transmission T is changed.

Figure 6:
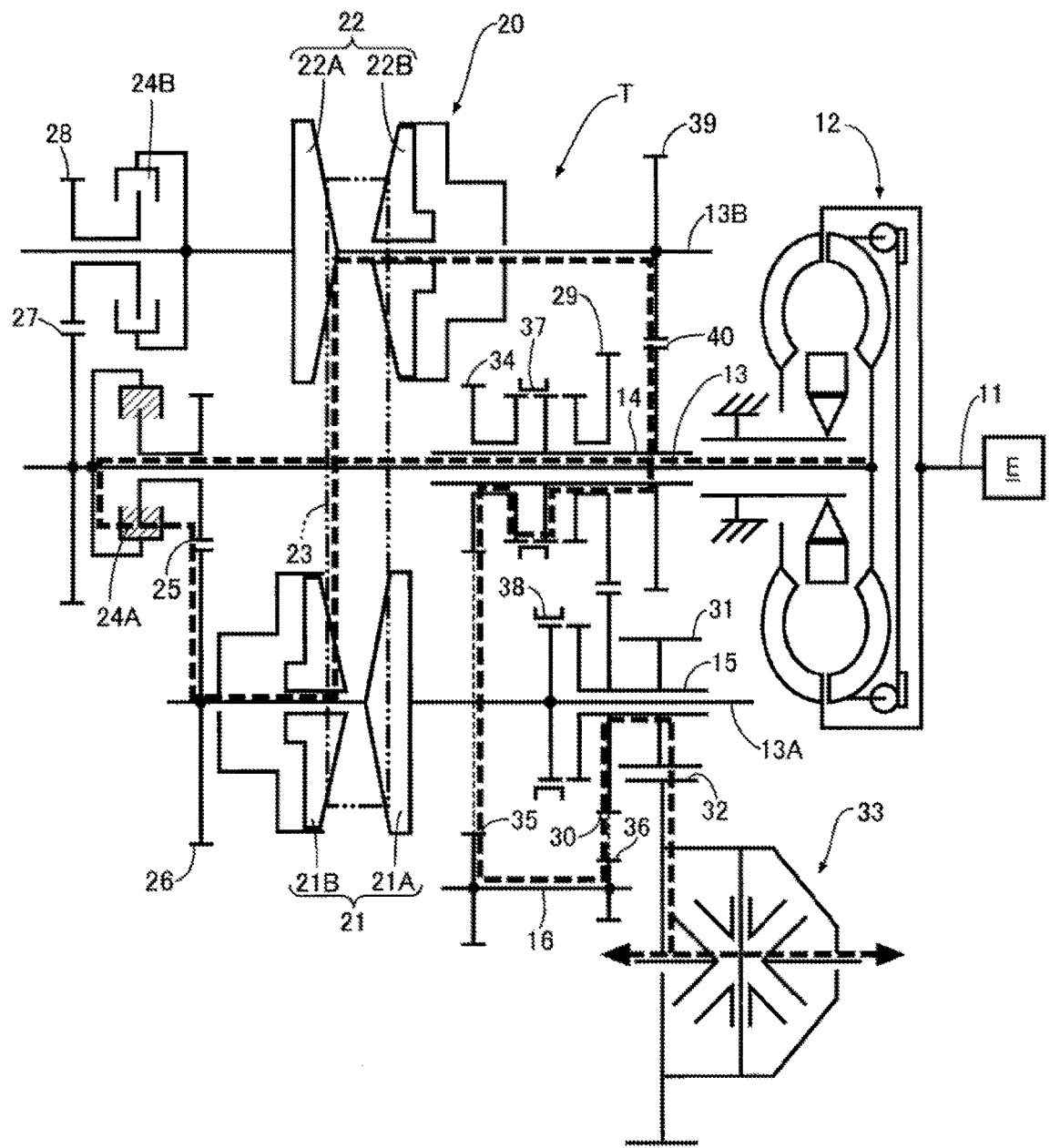
FIG. 6 is a torque flow diagram of a reverse mode. (first embodiment)

FIG. 6 shows a reverse mode of the continuously variable transmission T. In the reverse mode, the LOW fiction clutch 24A is engaged, the HI friction clutch 24B is disengaged, the first output switching mechanism 37 is operated to the leftward-moved position (RVS position), and the second output switching mechanism 38 is operated to the neutral position.

As a result, the driving force of the engine E is transmitted to the differential gear 33 as reverse rotation via the path: crankshaft 11→torque converter 12→main input shaft 13→LOW fiction clutch 24A→first reduction gear 25→second reduction gear 26→first auxiliary input shaft 13A→first pulley 21→endless belt 23→second pulley 22→second auxiliary input Shaft 13B→third reduction gear 39→fourth reduction gear 40→countershaft 14→first output switching mechanism 37→reverse drive gear 34→reverse idle gear 35→idle shaft 16→reverse driven gear 36→sixth reduction gear 30→output shaft 15→final drive gear 31→final driven gear 32.

In the reverse mode, the belt type continuously variable transmission mechanism 20 transmits the driving force from the first auxiliary input shaft 13A side to the second auxiliary input shaft 13B side, and according to the change in the gear ratio thereof the overall gear ratio of the continuously variable transmission T is changed.

Figure 7:
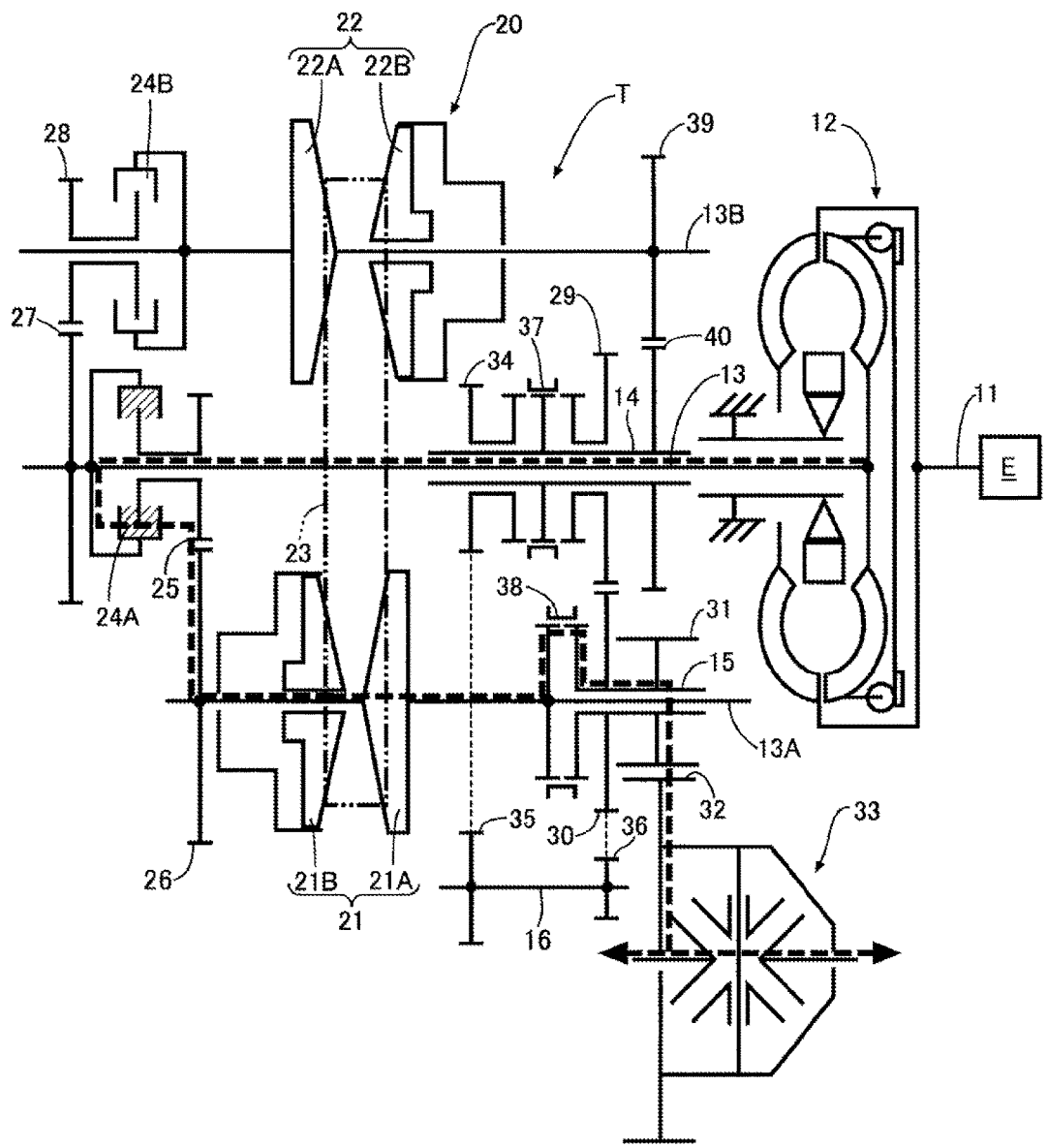
FIG. 7 is a torque flow diagram of a directly coupled LOW mode. (first embodiment)

FIG. 7 shows the directly coupled LOW mode of the continuously variable transmission T. In the directly coupled LOW mode, the LOW friction clutch 24A is engaged, the HI friction clutch 24B is disengaged, the first output switching mechanism 37 is operated to the neutral position, and the second output switching mechanism 38 is operated to the rightward-moved position (HI position).

As a result, the driving force of the engine E is transmitted to the differential gear 33 via the path: crankshaft 11→torque converter 12→main input shaft 13→LOW friction clutch 24A→first reduction gear 25→second reduction gear 26→first auxiliary input shaft 13A→second output switching mechanism 38→output shaft 15→final drive gear 31→final driven gear 32.

In the directly coupled LOW mode, the belt type continuously variable transmission mechanism 20 is not operated, and the overall gear ratio of the continuously variable transmission T is constant.

Figure 8:
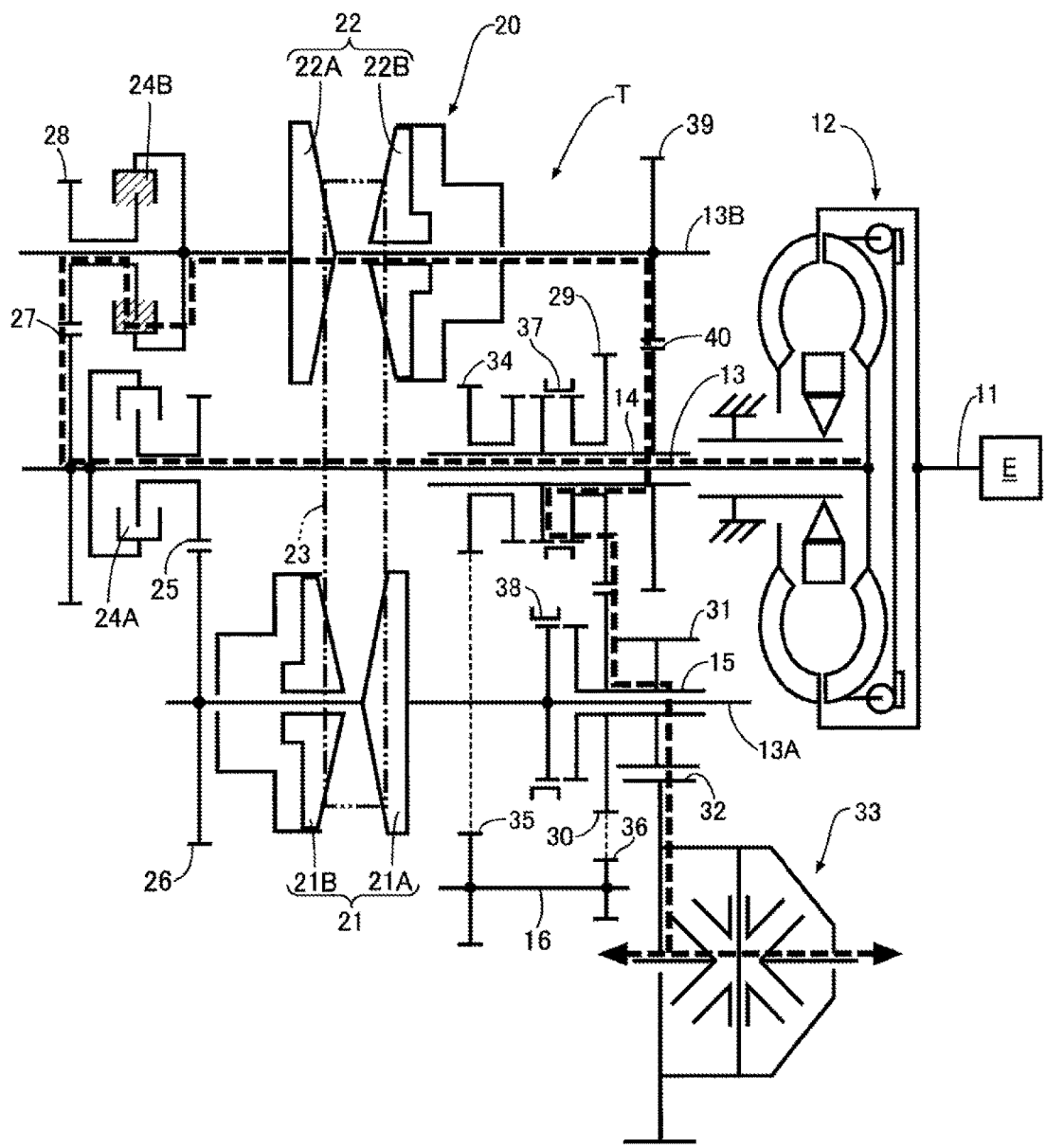
FIG. 8 is a torque flow diagram of a directly coupled HI mode. (first embodiment)

FIG. 8 shows the directly coupled HI mode of the continuously variable transmission T. In the directly coupled HI mode, the LOW fiction clutch 24A is disengaged, the HI friction clutch 24B is engaged, the first output switching mechanism 37 is operated to the rightward-moved position (LOW position), and the second output switching mechanism 38 is operated to the neutral position.

As a result, the driving force of the engine E is transmitted to the differential gear 33 via the path: crankshaft 11→torque converter 12→main input shaft 13→first induction gear 27→second induction gear 28→HI friction clutch 24B→second auxiliary input shaft 13B→third reduction gear 39→fourth reduction gear 40→countershaft 14→first output switching mechanism 37→fifth reduction gear 29→sixth reduction gear 30→output shaft 15→final drive gear 31→final driven gear 32.

In the directly coupled HI mode, the belt type continuously variable transmission mechanism 20 is not operated, and the overall gear ratio of the continuously variable transmission T is constant.

The operation at a time of transition from the LOW mode to the HI mode is now explained.

Figure 9:
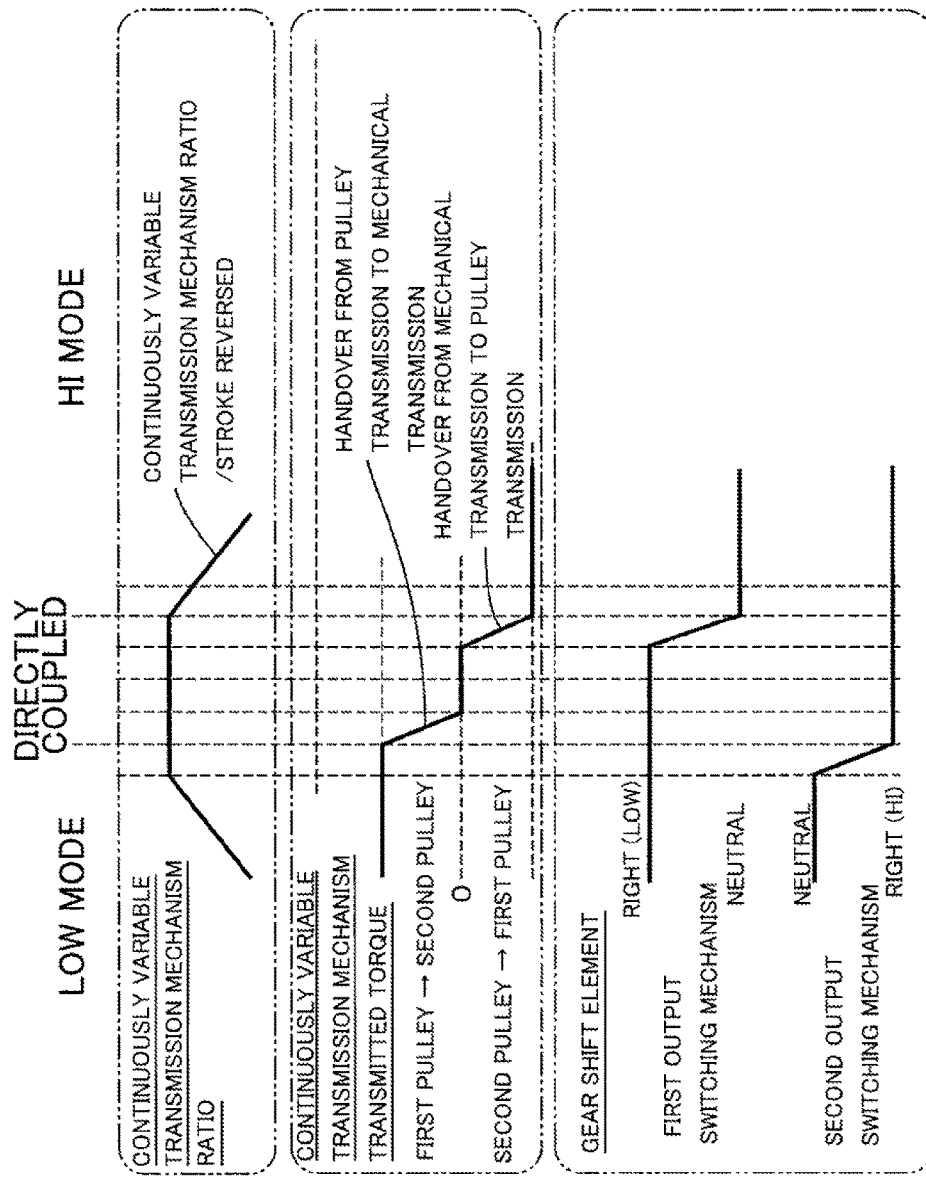
FIG. 9 is a diagram for explaining the transition between the LOW mode and the HI mode. (first embodiment)

As shown in FIG. 9, in the LOW mode shown in FIG. 2, when the gear ratio from the first pulley 21 to the second pulley 22 of the belt type continuously variable transmission mechanism 20 gradually decreases and attains the minimum gear ratio $i_{min}$, the second output switching mechanism 38, which has until this time been in the neutral position, is operated to the rightward-moved position (HI position), thus attaining transition mode 1 shown in FIG. 3. Subsequently, the engagement relationship between the LOW friction clutch 24A and the HI friction clutch 24B is switched over to thus attain transition mode 2 shown in FIG. 4, and the first output switching mechanism 37, which has been in the rightward-moved position (LOW position), is then operated to the neutral position, thus attaining the HI mode shown in FIG. 5.

At the end of the LOW mode and the beginning of the HI mode, the overall gear ratio of the continuously variable transmission T is the same, thereby preventing the occurrence of gear shift shock when switching from the LOW mode to the HI mode. It enables smooth operation of the first output switching mechanism 37, the second output switching mechanism 38, the LOW friction clutch 24A, and the HI friction clutch 24B by preventing the occurrence of differential rotation when the second output switching mechanism 38 is moved rightward to the HI position at a time of transition from the LOW mode to transition mode 1, when the LOW friction clutch 24A and the HI friction clutch 24B are interchangeably engaged at a time of transition from transition mode 1 to transition mode 2, and when the first output switching mechanism 37 moves leftward to the neutral position at a time of transition from transition mode 2 to the HI mode.

In order to explain this in detail, assume that the gear ratio $i_{red}$ from the first reduction gear 25 to the second reduction gear 26 is 1.5, the gear ratio $i_{ind}$ from the first induction gear 27 to the second induction gear 28 is 0.75, the minimum gear ratio $i_{min}$ from the first pulley 21 to the second pulley 22 of the belt type continuously variable transmission mechanism 20 is 0.5, the gear ratio $i_{sec}$ from the third reduction gear 39 to the sixth reduction gear 30 via the fourth reduction gear 40 and the fifth reduction gear 29 is 2.0, and the rotational speed of the input shaft 13 is 1500 rpm.

In the power transmission path of transition mode 1, the power transmission path of the LOW mode and the power transmission path of the directly coupled LOW mode coexist; in the power transmission path of the LOW mode, when the main input shaft 13 rotates at 1500 rpm, the first auxiliary input shaft 13A is reduced in speed at $i_{red}$=1.5 to 1000 rpm by the first and second reduction gears 25 and 26, the second auxiliary input shaft 13B is increased in speed at $i_{min}$=0.5 to 2000 rpm by the belt type continuously variable transmission mechanism 20, and the output shaft 15 is reduced in speed at $i_{ind}$=2.0 by the third reduction gear 39, the fourth reduction gear 40, the fifth reduction gear 29, and the sixth reduction gear 30 and rotates at 1000 rpm. On the other hand, in the power transmission path of the directly coupled LOW mode, when the main input shaft 13 rotates at 1500 rpm, the first auxiliary input shaft 13A is reduced in speed at $i_{red}$=1.5 to 1000 rpm by the first and second reduction gears 25 and 26, and the output shaft 15, which is directly coupled to the first auxiliary input shaft 13A, rotates at 1000 rpm.

In the power transmission path of transition mode 2, the power transmission path of the HI mode and the power transmission path of the directly coupled HI coexist; in the power transmission path of the HI mode, when the main input shaft 13 rotates at 1500 rpm, the second auxiliary input shaft 13B is increased in speed at $i_{ind}$=0.75 by the first and second induction gears 27 and 28 and attains 2000 rpm, the first auxiliary input shaft 13A is reduced in speed at $1/i_{min}$=2.0 by the belt type continuously variable transmission mechanism 20 and attains 1000 rpm, and the output shaft 15 directly coupled to the first auxiliary input shaft 13A rotates at 1000 rpm. On the other hand, in the power transmission path of the directly coupled HI mode, when the main input shaft 13 rotates at 1500 rpm, the second auxiliary input shaft 13B is increased in speed at $i_{ind}$=0.75 by the first and second induction gears 27 and 28 and attains 2000 rpm, and the output shaft 15 is reduced in speed at $i_{ind}$=2.0 by the third reduction gear 39, the fourth reduction gear 40, the fifth reduction gear 29, and the sixth reduction gear 30 and rotates at 1000 rpm.

As described above, when shifting between the LOW mode, transition mode 1, transition mode 2, and the HI mode, the rotational speeds of the main input shaft 13, the first auxiliary input shaft 13A, the second auxiliary input shaft 13B, the countershaft 14, and the output shaft 15 do not change at all, the gear ratio of the belt type continuously variable transmission mechanism 20 is maintained at $i_{min}$, and it is therefore possible to smoothly carry out operation of the first output switching mechanism 37, the second output switching mechanism 38, the LOW friction clutch 24A, and the HI friction clutch 24B in a state in which there is no differential rotation.

Furthermore, at the time of transition from transition mode 1 to transition mode 2, the belt type continuously variable transmission mechanism 20 switches from the power transmission state of first pulley 21→second pulley 22 to the power transmission state of second pulley 22→first pulley 21, and there is an instant when torque transmission is temporarily interrupted. However, since at that instant the directly coupled LOW mode and the directly coupled HI mode are in existence to thus transmit torque, it is possible to prevent the occurrence of a shock due to interruption of torque transmission.

Figure 10:
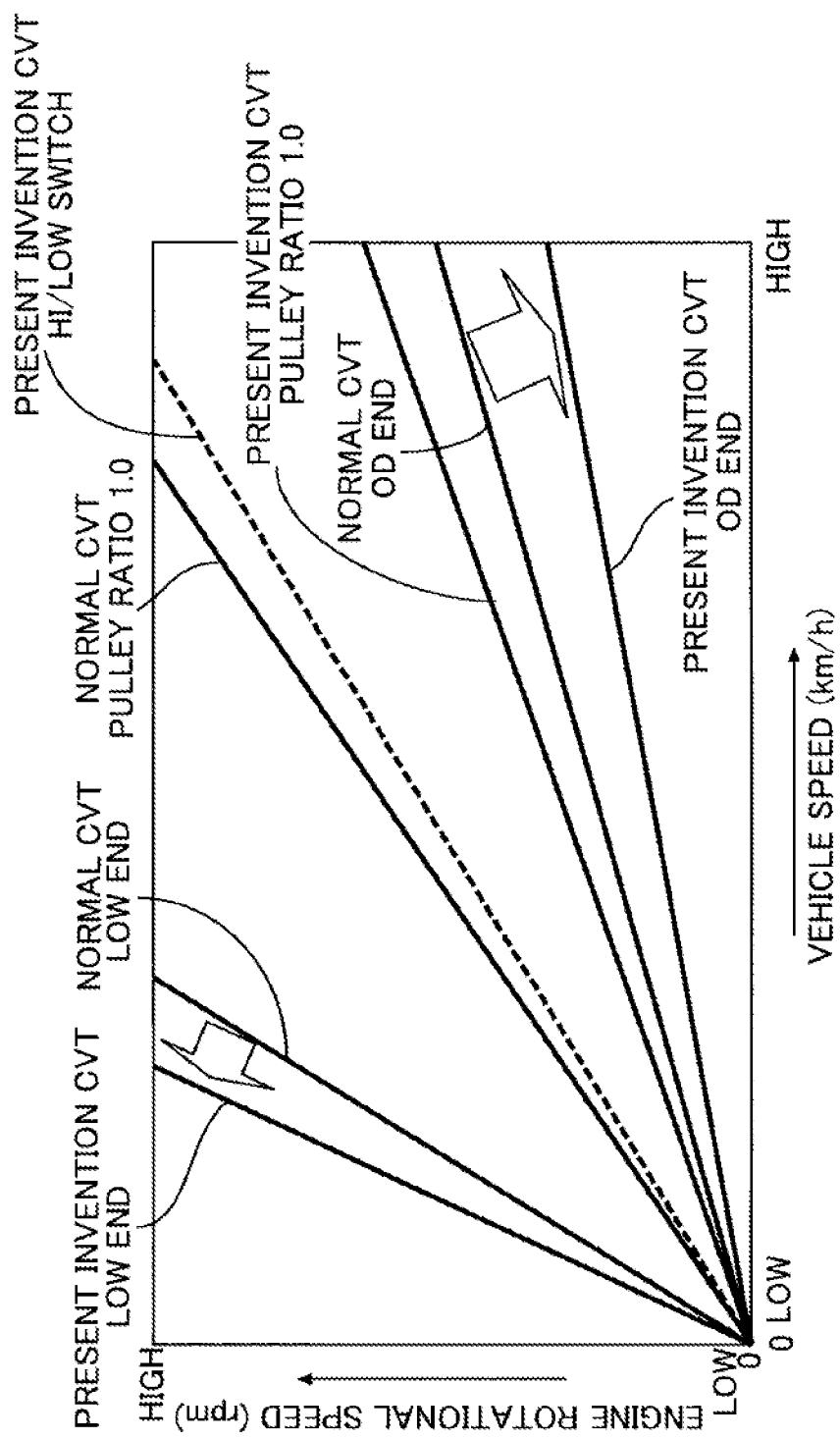
FIG. 10 is a diagram showing the relationship between overall gear ratio and gear ratio of a belt type continuously variable transmission mechanism. (first embodiment)
Figure 11:
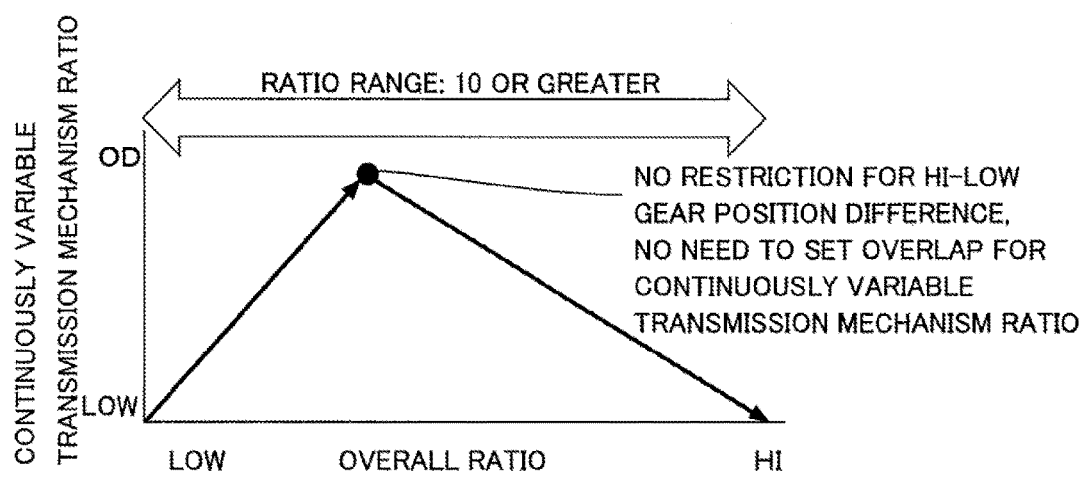
FIG. 11 is a diagram for explaining the difference in overall gear ratio between the invention of the present application and a Comparative Example. (first embodiment)

As described above, in accordance with this embodiment, due to the belt type continuously variable transmission mechanism 20 being combined with the speed decreasing mechanism, which includes the first reduction gear 25, the second reduction gear 26, the third reduction gear 39, the fourth reduction gear 40, the fifth reduction gear 29, and the sixth reduction gear 30, and the speed increasing mechanism, which includes the first induction gear 27 and the second induction gear 28, as shown in FIG. 10, compared with a single belt type continuously variable transmission mechanism (overall gear ratio=about 6 to 7), the gear ratio on the LOW side and the gear ratio on the OD side are both increased, thus enabling an overall gear ratio as large as 10 or greater to be achieved (see FIG. 11). Furthermore, in the continuously variable transmission T of the present embodiment, the overall gear ratio when the gear ratio of the belt type continuously variable transmission mechanism 20 is 1.0 is a value close to the overall gear ratio at the OD end of the single belt type continuously variable transmission mechanism, and it can be seen that the effect in increasing the gear ratio on the OD side is particularly prominent.

In the LOW mode, since rotation of the engine E is reduced in speed with a high gear ratio and transmitted to the differential gear 33, a large torque acts on the first output switching mechanism 37 disposed in the power transmission path thereof. However, with regard to the first output switching mechanism 37, the tubular countershaft 14 is fitted around the outer periphery of the inner main input shaft 15 to form a double tube structure, the countershaft 14, which transmits a large torque, is disposed on the outer peripheral side of the double tube and supported directly by the transmission case, the main input shaft 13, which transmits a relatively small torque, is supported via the countershaft 14, and it thereby becomes possible to support the first output switching mechanism 37 with high rigidity without carrying out special reinforcement.

Furthermore, since the first output switching mechanism 37 is formed from a dog clutch that can selectively join to the countershaft 14 the fifth reduction gear 29 and the reverse drive gear 34, which are relatively rotatably supported on the countershaft 14, not only is it possible to reduce the drag resistance compared with a case in which a friction clutch is used, but it is also possible to selectively establish the LOW mode and the RVS mode merely by operating the first output switching mechanism 37 with a single actuator, thereby enabling the structure thereof to be simplified.

Moreover, since the first fixed pulley 21A of the first pulley 21 and the second fixed pulley 22A of the second pulley 22 are disposed at mutually diagonal positions, the first movable pulley 21B of the first pulley 21 and the second movable pulley 22B of the second pulley 22 are disposed at mutually diagonal positions, the HI friction clutch 24B and the second induction gear 28 are disposed on the rear face side of the second fixed pulley 22A, the second output switching mechanism 38 and the output Shaft 15 are disposed on the rear face side of the first fixed pulley 21A, and the first output switching mechanism 37 is disposed at a position in which part thereof overlaps the second output switching mechanism 38 when viewed in the radial direction, it is possible to utilize effectively dead space formed on the rear face side of the first and second fixed pulleys 21A and 22A, thereby enabling the size of the continuously variable transmission T to be reduced.

An embodiment of the present invention is explained above, but the present invention may be modified in a variety of ways as long as the modifications do not depart from the spirit and scope thereof.

For example, in the embodiment the LOW friction clutch 24A is disposed on the main input shaft 13, and the HI friction clutch 24B is disposed on the second auxiliary input shaft 13B, but a LOW friction clutch 24A may be disposed on a first auxiliary input shaft 13A, and a HI friction clutch 24B may be disposed on a main input shaft 13.

Furthermore, the drive source of the present invention is not limited to the engine E and may be a drive source of another type such as a motor/generator.

The invention claimed is:

1. A continuously variable transmission comprising:
   an input shaft into which driving force from a drive source is inputted;
   a belt type continuously variable transmission mechanism that is formed from a first pulley, a second pulley, and an endless belt;
   an output shaft that outputs the driving force whose speed has been changed by the belt type continuously variable transmission mechanism;
   a first input path that transmits the driving force from the drive source to the first pulley;
   a first input switching mechanism that switches the driving force from the drive source toward the first input path side;
   a speed decreasing mechanism that is disposed in the first input path and decreases the speed of an input to the first pulley;
   a second input path that transmits the driving force from the drive source to the second pulley;
   a second input switching mechanism that switches the driving force from the drive source (E) toward the second input path side;
   a speed increasing mechanism that is disposed in the second input path and increases the speed of an input to the second pulley;
   a first output path that outputs the driving force from the second pulley;
   a second output path that outputs the driving force from the first pulley, a first output switching mechanism that is disposed in the first output path and switches the driving force from the second pulley toward the output shaft side; and
   a second output switching mechanism that is disposed in the second output path and switches the driving force from the first pulley toward the output shaft side,
   the first pulley comprises a first fixed pulley and a first movable pulley, the second pulley comprises a second fixed pulley and a second movable pulley, the first fixed pulley and the second fixed pulley are disposed at mutually diagonal positions, the first movable pulley and the second movable pulley are disposed at mutually diagonal positions,
   the first input switching mechanism is disposed on the input shaft or on a rotating shaft on a rear face of the first movable pulley of the first pulley, the second input switching mechanism is disposed on a rotating shaft on a rear face of the second fixed pulley of the second pulley or on the input shaft,
   the first output switching mechanism is disposed on a countershaft relatively rotatably fitted around an outer periphery of the input shaft on the first output path, and the second output switching mechanism and the output shaft are disposed on a rotating shaft on a rear face of the first fixed pulley of the first pulley.

2. The continuously variable transmission according to claim 1, wherein the first output switching mechanism is formed from a dog clutch that can selectively join to the countershaft a first drive gear and a second drive gear relatively rotatably supported on the countershaft, the first drive gear is connected to a driven gear provided on the output shaft, and the second drive gear is connected to the driven gear provided on the output shaft via an idle shaft.

3. The continuously variable transmission according to claim 2, wherein the first output switching mechanism is disposed at a position in which part thereof overlaps the second output switching mechanism When viewed in a radial direction.

4. The continuously variable transmission according to claim 2, wherein when a gear ratio of the speed decreasing mechanism is $i_{red}$, a gear ratio of the speed increasing mechanism is $i_{ind}$, the minimum ratio of the first pulley and the second pulley is $i_{min}$, and a gear ratio of the reduction gears disposed in the first output path is $i_{sec}$, the relationship $i_{red} \times i_{min} = i_{ind}$ and the relationship $i_{sec} = i_{red}/i_{ind}$ hold.

5. The continuously variable transmission according to claim 1, wherein the first output switching mechanism is disposed at a position in which part thereof overlaps the second output switching mechanism when viewed in a radial direction.

6. The continuously variable transmission according to claim 5, wherein when a gear ratio of the speed decreasing mechanism is $i_{red}$, a gear ratio of the speed increasing mechanism is $i_{ind}$, the minimum ratio of the first pulley and the second pulley is $i_{min}$, and a gear ratio of the reduction gears disposed in the first output path is $i_{sec}$, the relationship $i_{red} \times i_{min} = i_{ind}$ and the relationship $i_{sec} = i_{red}/i_{ind}$ hold.

7. The continuously variable transmission according to claim 1, wherein when a gear ratio of the speed decreasing mechanism is $i_{red}$, a gear ratio of the speed increasing mechanism is $i_{ind}$, the minimum ratio of the first pulley and the second pulley is $i_{min}$, and a gear ratio of the reduction gears disposed in the first output path is $i_{sec}$, the relationship $i_{red} \times i_{min} = i_{ind}$ and the relationship $i_{sec} = i_{red}/i_{ind}$ hold.

* * * * *